(12) United States Patent
Barman et al.

(10) Patent No.: US 7,224,714 B1
(45) Date of Patent: May 29, 2007

(54) METHOD AND APPARATUS FOR CHANNEL CHARACTERIZATION IN DIRECT SEQUENCE SPREAD SPECTRUM BASED WIRELESS COMMUNICATION SYSTEMS

(75) Inventors: Kaushik Barman, Andhra Pradesh (IN); Vellenki Umapathi Reddy, Andhra Pradesh (IN)

(73) Assignee: Hellosoft, Inc., San Jose, CA (US)

( * ) Notice: Subject to any disclaimer, the term of this patent is extended or adjusted under 35 U.S.C. 154(b) by 772 days.

(21) Appl. No.: 10/423,739

(22) Filed: Apr. 25, 2003

(51) Int. Cl.
  *H04B 1/00* (2006.01)
(52) U.S. Cl. ............................ 375/140; 375/142
(58) Field of Classification Search ................ 375/142, 375/144, 148, 150, 267, 343, 346, 34
  See application file for complete search history.

(56) References Cited

U.S. PATENT DOCUMENTS

| | | | | |
|---|---|---|---|---|
| 5,757,853 A | * | 5/1998 | Tsujimoto | 375/141 |
| 6,693,954 B1 | * | 2/2004 | King et al. | 375/147 |
| 2003/0152178 A1 | * | 8/2003 | Tanno et al. | 375/354 |
| 2004/0071200 A1 | * | 4/2004 | Betz et al. | 375/152 |
| 2004/0170237 A1 | * | 9/2004 | Chadha et al. | 375/343 |

* cited by examiner

*Primary Examiner*—David C. Payne
*Assistant Examiner*—Aslan Ettehadieh
(74) *Attorney, Agent, or Firm*—William L. Botjer

(57) ABSTRACT

A method and apparatus for multi-path channel characterization in a Direct Sequence Spread Spectrum based wireless communication system is provided. The multipath channel is modeled as a tapped delay line FIR filter with L taps corresponding to L paths. A pre-defined training sequence is transmitted over the multipath channel. The received signal is sampled and cross correlations are computed between the samples obtained and the spreading sequence for various time lags to obtain the symbol boundary. Thereafter, a desired set of L cross correlations for L time lags around the symbol boundary is estimated. For this, all the L possible sets of L cross correlations for L time lags around the symbol boundary are considered. The energy in the cross correlations corresponding to each considered set is calculated. The set of L cross correlations having the maximum energy is selected for tap computation. The tap coefficients are estimated by solving a set of L simultaneous linear equations.

4 Claims, 4 Drawing Sheets

METHOD AND APPARATUS FOR CHANNEL CHARACTERIZATION IN DIRECT SEQUENCE SPREAD SPECTRUM BASED WIRELESS COMMUNICATION SYSTEMS

BACKGROUND

The present invention relates to Direct Sequence Spread Spectrum based wireless communication systems, and deals specifically with multipath channel characterization.

An example of a wireless communication system wherein multipath is encountered is a Wireless Local Area Network (WLAN). With recent advancements in wireless and mobile communications, there has been an increase in the popularity of WLANs as a substitute for the more conventional wired LANs. WLANs are being envisioned for use by enterprises and organizations with the aim of obviating the excess baggage that accompanies a wired LAN, such as plugs and wires. Further, installation of WLANs is easier and less time consuming as compared to the installation of wired LANs. Moreover, WLANs offer significant advantages to enterprise workers in terms of mobility and roaming. The workers may access the Internet and their organization's intranet from public access points such as airports, hotels and conference centres, using laptops, PDAs and other handheld equipment. Thus, the workers may stay connected and carry out their work even when they are on the move.

The Institute of Electrical and Electronics Engineers (IEEE) has proposed the 802.11 family of standards for the implementation of WLANs. The 802.11 family of standards includes the IEEE 802.11 standard and the IEEE 802.11b standard.

The IEEE 802.11 standard provides data transmission rates of 1 to 2 Mbps (Megabits per second) in the 2.4 GHz band. The IEEE 802.11b standard, also known commonly as 'Wi-Fi', is an extension of the 802.11 standard and provides data transmission rates of up to 11 Mbps in the 2.4 GHz band. The IEEE 802.11b standard is emerging as one of the more dominant standards for the commercial implementation of WLANs. As already mentioned, 802.11b is an extension of 802.11 and provides data transmission rates up to 11 Mbps, with a fallback to 5.5, 2 and 1 Mbps. 802.11 provides two types of physical layer specifications. These are Direct Sequence Spread Spectrum (DSSS) and Frequency-Hopped Spread Spectrum (FHSS). Both DSSS and FHSS physical layers support data rates of 1 Mbps as well as 2 Mbps. However, only DSSS is suitable for data rates of 5.5 Mbps and 11 Mbps, and is therefore used in the physical layer of 802.11b.

In such DSSS systems, the information bit sequence to be transmitted is first encoded into either Differential Binary Phase Shift Keying (DBPSK) symbols or Differential Quaternary Phase Shift Keying (DQPSK) symbols. Thereafter, each symbol is spread so as to cover a wider bandwidth. The spreading is achieved by multiplying the symbol with a spreading sequence. The spread symbol stream is then modulated onto a carrier frequency; the modulated signal is transmitted wirelessly. The transmitted signal is received and demodulated by a receiver and the information bit sequence is obtained.

In the wireless transmission of a DSSS signal, the signal typically travels through a number of different paths in the air. These multiple paths are caused by the reflection of the signal by various objects in the environment. The signals received on each of these paths are affected by delay, attenuation and a random phase introduced by these paths. The signal received at the receiver is the superposition of the signals received on each of these paths. For example, if there are L paths, the received signal is the sum of the L signals received on each of the L paths.

The presence of multipath in a wireless channel introduces Inter-Symbol Interference (ISI) in the received signal. The ISI is due to the received signal being a superposition of the signals received on each of the paths, and the signals received on each of the paths having undergone different delays.

Since a wireless multipath channel is a physical channel and is therefore causal i.e. the output of the channel at any time instant is not dependent on the input to the channel at any succeeding time instances, the ISI introduced in a signal passing through such a channel is only due to the symbols that have already passed through the channel. This ISI is referred to as postcursor ISI. The other type of ISI, referred to as precursor ISI, refers to the ISI caused by future symbols.

The ISI caused due to transmission of a signal through a multipath wireless channel can be removed or cancelled by processing the received signal with an equalizer, a filter that is designed to counter the ISI. This process is referred to as equalization and several techniques exist in the art for this.

Among the several possible equalization schemes, decision feedback equalization is chosen for implementation in the underlying WLAN system in view of its attractive features. A Decision Feedback Equalizer (DFE) consists of a feedforward transversal filter and a feedback transversal filter. The objective of the feedforward transversal filter is to minimize the distortion caused by the precursor ISI, and that of feedback transversal filter is to remove the postcursor ISI. If a channel is characterized in such a way that all the ISI is made up of post cursor ISI, the feedforward filter is not needed; a feedback transversal filter will remove the postcursor ISI. With the channel characterization as above, the feedback transversal filter forms the DFE. When the feedback transversal filter is implemented as a tapped delay line filter, the tap coefficients used in the implementation are known once the channel is characterized.

In reality, a multipath channel may be specular or diffused. A specular multipath channel comprises specular paths wherein each path is completely characterized by a single delay, a single attenuation coefficient and a single random phase. A diffused multipath channel comprises one or more non-specular paths. However, when a band-limited multipath channel is considered, the effective response is continuous in the time domain. Its sampled version may be viewed as a specular multi-path channel. This specular multipath channel may be modeled as a tapped delay line Finite-duration Impulse Response (FIR) filter with differential path delays equal to the tap spacings and the sample values as the tap values. The characterization of such a channel as a causal channel depends on the detection of the arrival time of the earliest path.

In DSSS based WLAN systems, a conventional correlation-based approach is used to detect the arrival times of different paths. In this approach, the received signal is sampled and the cross correlations are computed between the samples of the received signal and the reference spreading sequence for various time lags. The time lag for which the correlation magnitude is maximum is taken as the time of arrival of the earliest path, and also as the starting instant of the channel impulse response. Subsequently, the channel is completely characterized using a tapped delay line, as mentioned above.

However, the conventional approach suffers from the following drawback. If the energy in the earliest path is low, the time lag for which the correlation magnitude is maximized does not correspond to the time of arrival of the earliest path. Consequently, the starting instant of the channel impulse response may be taken to be later than the actual value. This results in precursor ISI, which may not be effectively removed regardless of how complex an equalizer is used. As a result of this, the Packet Error Rate (PER) increases and may go beyond the acceptable levels defined in the IEEE 802.11b standard.

From the above, it is clear that there is a need for a multipath channel characterization technique that estimates the arrival time of the earliest path, regardless of the energy in the earliest path.

SUMMARY

The present invention is directed to a method and system that characterizes a multi-path channel as a casual channel in a DSSS based wireless communication system such as a WLAN.

An objective of the present invention is to provide a method and system that effectively characterizes a multi-path channel in a DSSS based wireless communication system so that the precursor ISI is minimized.

Another objective of the present invention is to provide a method and system that effectively characterizes a multi-path channel in a DSSS based wireless communication system so that the PER is lower than in the case of a conventional characterization technique.

Yet another objective of the present invention is to provide a method and system that models a multi-path channel in a DSSS based wireless communication system as a tapped delay line FIR filter by estimating the tap coefficients to be used in the filter.

To achieve the foregoing objectives, and in accordance with the purpose of the present invention as broadly described herein, the present invention provides a method and system for characterizing a multi-path channel as a causal channel in a DSSS based wireless communication system. The method and system uses a pre-defined training sequence for this purpose. The pre-defined training sequence is first encoded into a DBPSK symbol sequence and then spread using a spreading sequence. The spread symbol stream is then modulated onto a carrier frequency and is thereafter transmitted wirelessly over a multi-path channel. The signal received at the receiver is sampled. Thereafter, the cross correlations between the samples and the reference spreading sequence are computed for various time lags. The time lag for which the cross correlation magnitude is the highest is selected as the symbol boundary for the received signal. Subsequently, the time of arrival of the earliest path (the symbol boundary in the earliest path of the multi-path channel as well as a desired set of cross correlations are estimated by considering various sets of cross correlations for consecutive time lags on both sides of the symbol boundary, each set containing L correlations. The energy in the cross correlations in each of these sets is calculated and the set with the maximum energy is selected as the desired set. Using the cross correlations from the selected set, a set of simultaneous equations is formed. The time instant corresponding to the time lag of the first element in the selected set is taken as the time of arrival of the earliest path. By solving the set of simultaneous linear equations, the tap coefficients to be used in the tapped delay line FIR filter are estimated.

BRIEF DESCRIPTION OF THE DRAWINGS

The preferred embodiments of the invention will hereinafter be described in conjunction with the appended drawings, provided to illustrate and not to limit the invention, wherein the designations denote like elements, and in which.

DESCRIPTION OF PREFERRED EMBODIMENTS

The present invention provides a method and system for multi-path channel characterization in a DSSS based wireless communication system.

In the physical layer of a DSSS based wireless communication system such as IEEE 802.11b based WLAN, an information bit sequence is first encoded into DBPSK or DQPSK symbols, which are then spread using a spreading sequence. For a data rate of 1 Mbps, the data is encoded into DBPSK symbols. For a data rate of 2 Mbps, the data is encoded into DQPSK symbols. The symbols are spread with a Barker sequence of length 11. The spreading sequence is made up of several smaller duration pulses, hereinafter referred to as chips.

The signal formed after the spreading is modulated onto a carrier frequency and then transmitted over-the-air. Typically, the signal traverses multiple paths in the air before reaching its destination. Each of these paths introduces an attenuation, a propagation delay (hereinafter referred to as delay) and a random phase. Thus, effectively the signal travels through a multi-path channel before being received by a receiver.

In the preferred embodiment of the present invention, it is assumed that the multi-path channel is made up of L paths, where L is a positive integer. Thus, the baseband impulse response of the multi-path channel is characterized as:

$$h(t) = \sum_{i=0}^{L-1} \alpha_i e^{j\theta_i} \delta(t - \tau_i) \quad (1)$$

where, $\alpha_i$ denotes the attenuation of the $i^{th}$ path and is real, $\tau_i$ denotes the delay of the $i^{th}$ path, $\theta_i$ denotes the random phase introduced by the $i^{th}$ path, and $\delta(.)$ denotes the Dirac delta function.

While modeling a multi-path channel as a discrete time filter, the earliest path, i.e. the path corresponding to the $0^{th}$ path in equation 1, is taken as the reference. The excess delays of other paths are taken as the delays in the filter. Thus, the discrete-time filter representation of the multi-path channel of equation 1 is given by $$h(t) = \sum_{i=0}^{L-1} h_i \delta(t - (\tau_i - \tau_0)) \quad (2)$$

where
$h_i = \alpha_i e^{j\theta}$, with $h_i$ denoting the $i^{th}$ coefficient of the filter.

Figure 1:
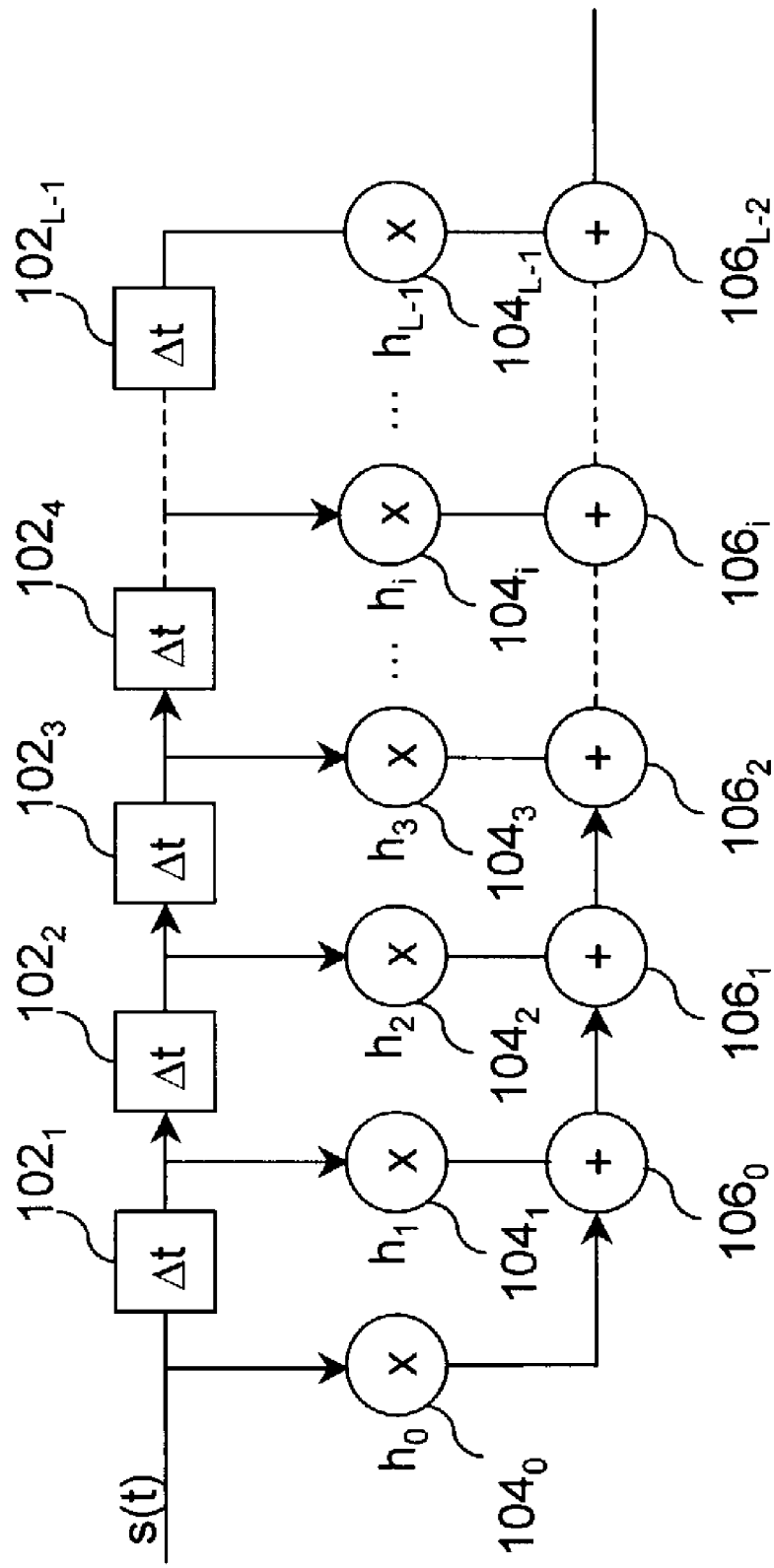
FIG. 1 is a block diagram illustrating a tapped delay line FIR filter with L taps.

A tapped delay line FIR filter with L taps, hereinafter referred to as an L-tap filter, is used for modeling the multi-path channel as a discrete-time filter. Referring primarily to FIG. 1, an L-tap filter is hereinafter described. Each tap of the filter represents a path of the multi-path channel. The L-tap filter comprises L−1 delay elements $102_1$ to $102_{L-1}$. When a signal s(t) passes through the L-tap filter, each delay element $102_1$ to $102_{L-1}$ introduces a delay of Δt (equal to the sampling time of the received signal) into s(t). The cumulative delay after each delay element corresponds to the delay of the path being modeled by the succeeding tap. Further, the L-tap filter also comprises L multiplication elements $104_0$ to $104_{L-1}$ and (L−1) addition elements $106_0$ to $106_{L-2}$. Each multiplication element $104_0$ to $104_{L-1}$ multiplies s(t) by a corresponding tap coefficient from the set $h_0$ to $h_{L-1}$. For example, the $i^{th}$ multiplication element $104_i$ multiplies the signal by $h_i$. Moreover, this $h_i$ is the same as the $i^{th}$ coefficient of the filter in equation 2. Addition elements $106_0$ to $106_{L-2}$ serve the purpose of adding the signal passing through each of the taps so that the received signal is the superposition of the signals received on each of the paths.

To characterize the multi-path channel completely using such an L-tap filter, appropriate tap coefficients and delays are estimated. For this purpose, a pre-defined training sequence is transmitted. This pre-defined training sequence can be any known sequence of bits. Each bit of the known training sequence is first encoded into a DBPSK symbol that is then spread by a pre-defined spreading sequence, hereinafter referred to as the spreading sequence. The knowledge of the bits of the pre-defined training sequence and the knowledge of the spreading sequence is exploited for characterizing the channel.

Figure 2:
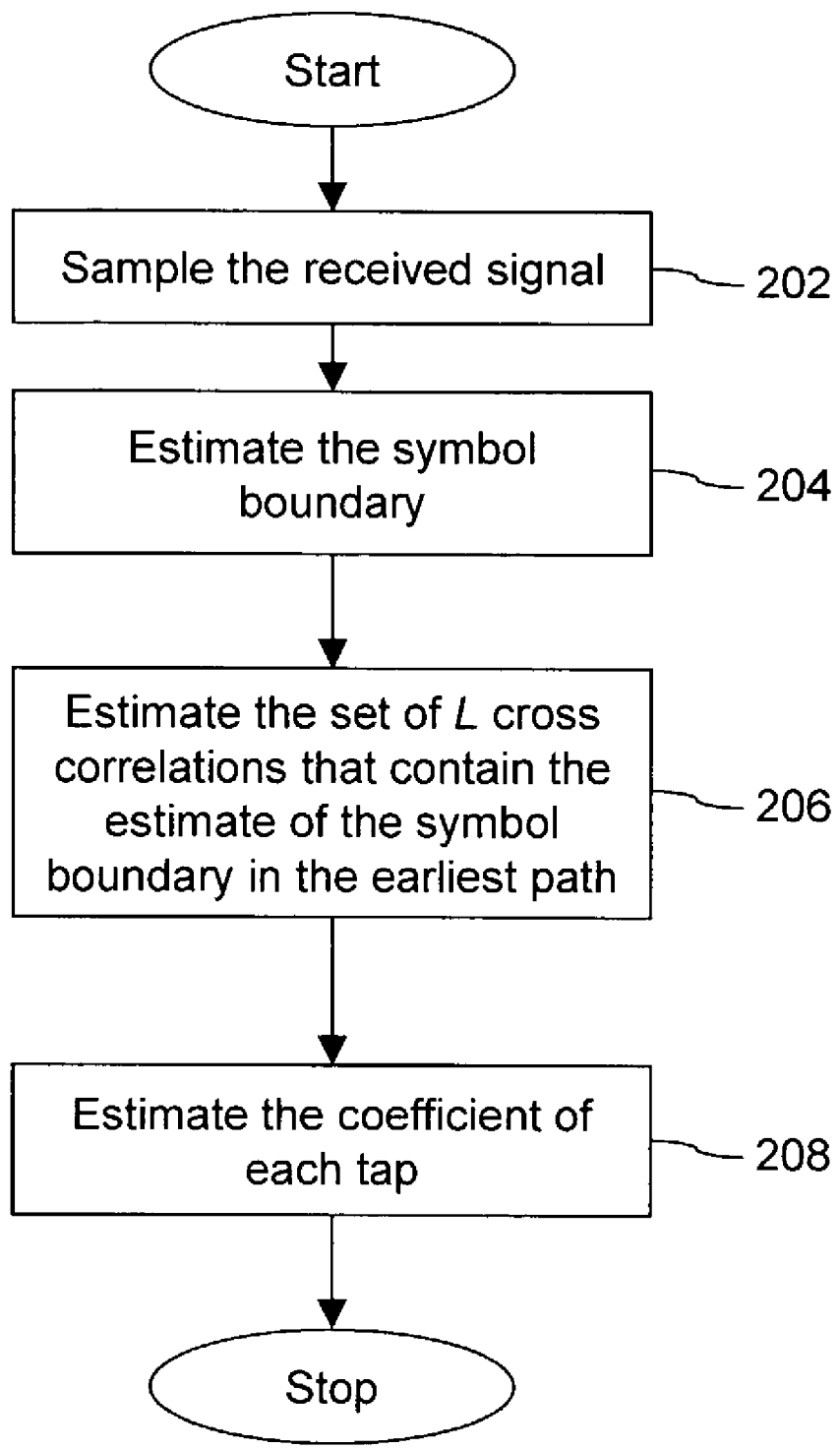
FIG. 2 is a flowchart illustrating the multi-path channel characterization method in accordance with the preferred embodiment of the present invention.
Figure 3:
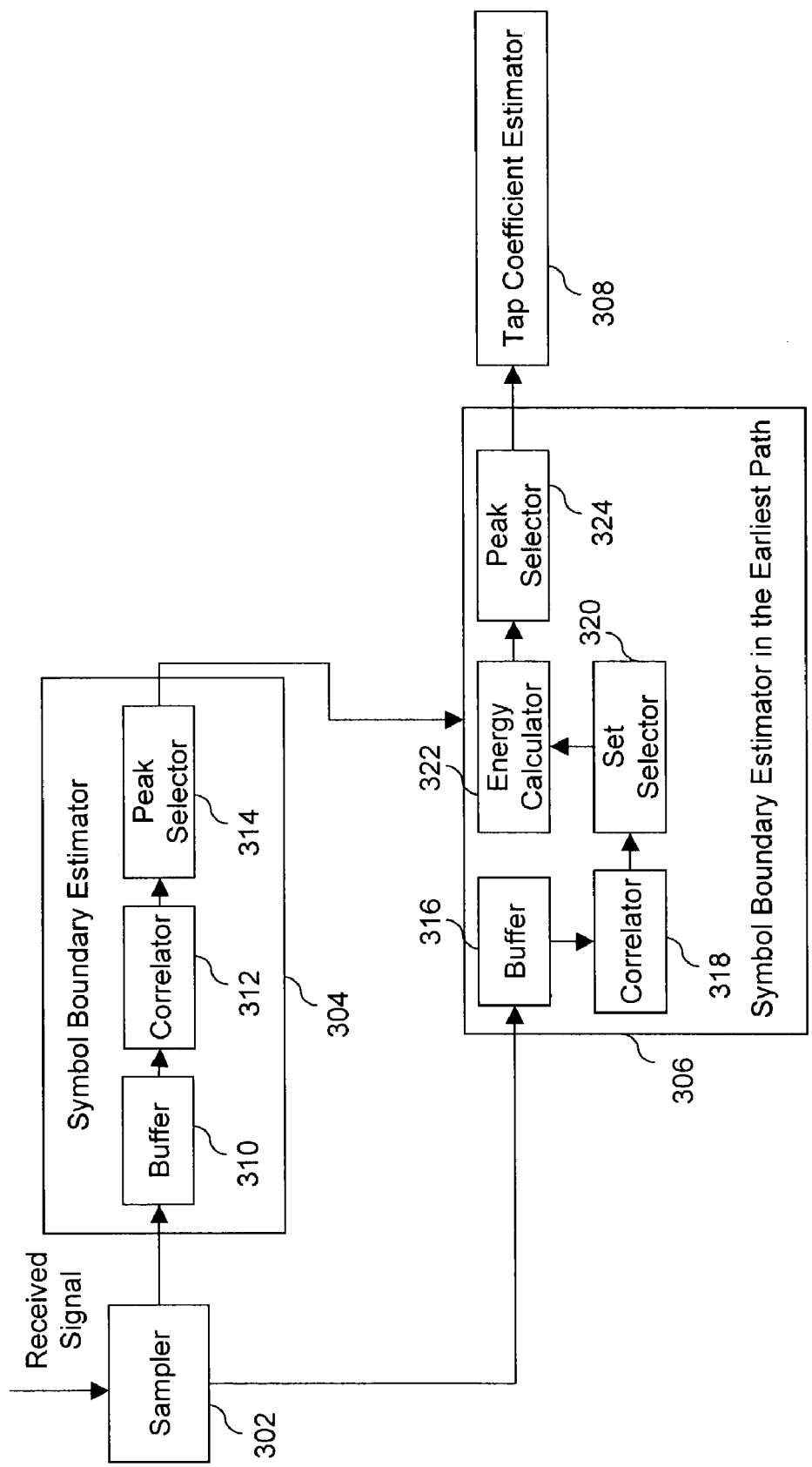
FIG. 3 is a block diagram illustrating the multi-path channel characterization system in accordance with the preferred embodiment of the present invention.

Referring now primarily to FIG. 2 and FIG. 3, the channel characterization method and system in accordance with the preferred embodiment of the present invention are hereinafter described. The method as well as the system provided by the present invention are implemented in a receiver of a DSSS based wireless communication system. FIG. 2 is a flowchart illustrating the method of channel characterization; FIG. 3 is a block diagram illustrating the system for multi-path channel characterization.

First, at step 202, the received signal is sampled at a pre-defined sampling rate by a Sampler 302 to obtain samples of the received signal. Let N denote the number of samples per symbol. Next, at step 204, the symbol boundary is estimated by a Symbol Boundary Estimator 304 using a conventional approach. This symbol boundary represents the boundary of the symbol in the transmitted signal in the strongest path.

Symbol Boundary Estimator 304 comprises a Buffer 310, a Correlator 312 and a Peak Selector 314. Buffer 310 buffers 2N samples of the received signal over two consecutive symbols. Correlator 312 computes the cross correlations between the buffered samples and the spreading sequence. The cross correlations are computed for a pre-defined first set of N different but equally spaced time lags, thus obtaining N cross correlations. The spacing between the consecutive time lags in the pre-defined first set is equal to the sampling interval. The equally spaced time lags are chosen such that they cover the entire duration of a symbol. The equation used for computing each of the N cross correlations is:

$$p_l = \sum_{n=0}^{N-1} b^*(n) y(n+1) \quad (3)$$

where,
b(n) denotes the $n^{th}$ sample of the spreading sequence,
y(n) denotes the $n^{th}$ buffered sample of the received signal,
l denotes the time lag for which the cross correlation is being calculated, and
* denotes the complex conjugate operator.

After these cross correlations have been computed, Peak Selector 314 selects the time lag for which the magnitude of the cross correlation is the highest. This time lag is taken as the symbol boundary estimate.

The symbol boundary obtained at step 204 is used at step 206 by a Symbol Boundary Estimator in the Earliest Path 306 to estimate a set of L cross correlations that contain the estimate of the symbol boundary in the earliest path.

Figure 4:
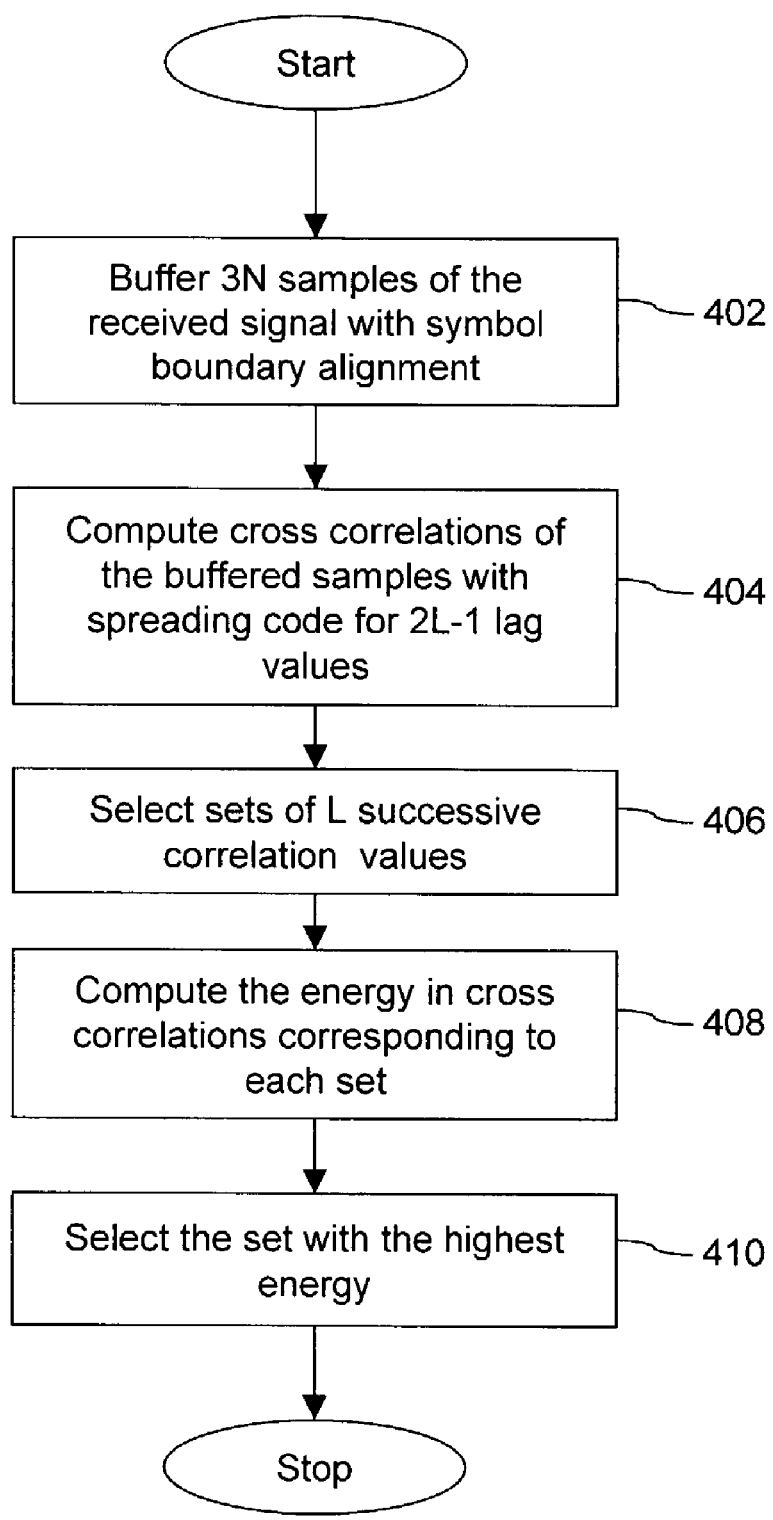
FIG. 4 is a flowchart illustrating the steps involved in estimating the desired set of cross correlations that contain the estimate of the symbol boundary in the earliest path in accordance with the preferred embodiment of the present invention.

Referring now primarily to FIG. 3 and FIG. 4, the step of estimating the set of L cross correlations and the structure of Symbol Boundary Estimator in the Earliest Path 306 are hereinafter described. At step 402, a Buffer 316 buffers 3N samples of the received signal with symbol boundary alignment using the symbol boundary given by Symbol Boundary Estimator 304. Thereafter, at step 404, a Correlator 318 computes the cross correlations between the buffered samples and the spreading sequence. The cross correlations are computed for a pre-defined second set of 2L−1 time lags so as to cover the L−1 positive lags and the L−1 negative lags with respect to a $0^{th}$ lag. The $0^{th}$ lag corresponds to the symbol boundary estimate given by Symbol Boundary Estimator 304 that is aligned with the beginning of the middle symbol of the modulated training sequence. The 2L−1 time lags are equally spaced and are located symmetrically on either side of the $0^{th}$ lag. The spacing between the time lags in this case is the same as the sampling interval. The L−1 equally spaced time lags on the right of the $0^{th}$ lag are denoted by numerals 1 to L−1 and the L−1 equally spaced time lags on the left of the $0^{th}$ lag are denoted by numerals −1 to −(L−1). Thus, the cross correlations are computed for a total of 2L−1 time lags, L−1 on each side of the symbol boundary. For example, if L is 8, a total of 15 cross correlations would be computed; equation 3 is used for computing these cross correlations.

After the cross correlations have been computed, at step 406, a Set Selector 320 selects L possible sets of L cross correlations for L consecutive time lags from the 2L−1 values mentioned above. Thus, all the possible sets corresponding to [−(L−1), −(L−2), . . . , −1,0] time lags to [0, 1, . . . , (L−2), (L−1)] time lags are considered. For each such set, the total energy in the L cross correlations corresponding to the L consecutive time lags in the set is computed at step 408 by an Energy Calculator 322. The total energy is computed by adding the squares of the magnitudes of the individual cross correlations. Thereafter, at step 410, a Peak Selector 324 selects the set of L cross correlations for which the total energy is the highest. The cross correlations in the selected set are used to estimate the tap coefficients of the L-tap FIR filter. The time instant corresponding to the time lag of which the first element in the selected set is taken as the time of arrival of the earliest path, which is the same as the symbol boundary in the earliest path.

Referring back to FIG. 2 and FIG. 3, the set of L cross correlations obtained at step 206 are used at step 208 by a Tap Coefficient Estimator 308 to estimate the tap coefficients to be used in the L-tap filter. For this purpose, L simultaneous linear equations are formed using the L cross correlations obtained by Symbol Boundary Estimator in the Earliest Path 306. The cross correlations between the samples of the received signal and the spreading sequence and the autocorrelations of the spreading sequences are used for forming the simultaneous linear equations. Thereafter, at step 208, the tap coefficients are obtained by solving the L simultaneous linear equations. The tap coefficients obtained by solving the linear equations are represented in a matrix form as follows:

$$h = R_{bb}^{-1} R_{by} \qquad (4)$$

where, h denotes the vector $[h_0\ h_1\ h_2\ \ldots\ h_{(L-1)}]^T$, with $h_i$ denoting the $i^{th}$ tap coefficient, $R_{by}$ denotes the vector $[p_0\ p_1\ p_2\ \ldots\ p_{(L-1)}]^T$, with $p_i$ denoting the $i^{th}$ cross correlation in the set of L cross correlations obtained in Symbol Boundary Estimator in the Earliest Path 306, with $p_0$ corresponding to first element of the set, and $R_{bb}$ denotes the autocorrelation matrix, which is given by $$R_{bb} = d(0) \begin{bmatrix} r_{bb}(0) & r_{bb}(1) & \ldots & r_{bb}(L-1) \\ r_{bb}(1) & r_{bb}(0) & \ldots & r_{bb}(L-2) \\ \ldots & \ldots & \ldots & \ldots \\ r_{bb}(L-1) & r_{bb}(L-2) & \ldots & r_{bb}(0) \end{bmatrix} + $$
$$d(-1) \begin{bmatrix} 0 & r_{bb}(N-1) & \ldots & r_{bb}(N-L+1) \\ 0 & 0 & \ldots & r_{bb}(N-L+2) \\ \ldots & \ldots & \ldots & \ldots \\ 0 & 0 & \ldots & 0 \end{bmatrix} + $$
$$d(1) \begin{bmatrix} 0 & 0 & \ldots & 0 \\ r_{bb}(N-1) & 0 & \ldots & 0 \\ \ldots & \ldots & \ldots & \ldots \\ r_{bb}(N-L+1) & r_{bb}(N-L+2) & \ldots & r_{bb}(N) \end{bmatrix} \qquad (5)$$

where $r_{bb}(i)$ denotes the autocorrelation of the spreading sequence for the $i^{th}$ time lag, and d(0), d(1) and d(−1) refer to the middle symbol, the succeeding symbol and the previous symbol respectively.

One mode of reduction to practice of the preferred embodiment of the present invention is hereinafter described. The training sequence at 1 Mbps is first encoded into DBPSK symbols that is then spread to a bandwidth of 11 MHz using a Barker sequence of length 11, resulting in 11 chips per symbol. The multi-path channel is modeled as a 16-tap FIR filter. The received signal is sampled at a frequency of 44 MHz, resulting in N=44 i.e. 44 samples per symbol. The 16 cross correlations are determined in the manner as discussed above. The 16 tap coefficients are determined by solving a set of 16 simultaneous linear equations in the manner discussed above.

An alternative mode of reduction to practice of the present invention involves sampling at a frequency of 22 MHz with the multipath channel being modeled as an 8-tap FIR filter.

The 8 cross correlations are determined in the manner as discussed above. The 8 tap coefficients are determined by solving a set of 8 simultaneous linear equations in the manner as discussed above.

It would be apparent to anyone skilled in the art that the various components of the system, as shown in FIG. 3, may be implemented using Digital Signal Processors (DSPs), as the components only involve complex additions, complex multiplications and logical operations. Alternatively, these components may be implemented using digital logic in Field Programmable Gate Arrays (FPGAs) or in Application Specific Integrated Circuit (ASICs).

It would be apparent to anyone skilled in the art that the present invention may be embodied as a computer program product using either a processor specific assembly language or a high-level language such as C. The embodiment of the present invention as a computer program product is used for the implementation of a channel characterization system. It can also be used for the simulation of the channel characterization system.

The present invention has the following advantage over the conventional characterization technique. The present invention provides a good estimate of the time of arrival of the earliest path, even when the earliest path is weak. A result of this is the minimization of precursor ISI, which is a major source of error in conventional characterization. Thus, the PER comes down as compared to the conventional method, which has been verified by simulations.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for characterization of a multi-path channel in a Direct Sequence Spread Spectrum (DSSS) based wireless communication system, the multi-path channel being modeled as a tapped delay line Finite Impulse Response (FIR) filter, the tapped delay line FIR filter having L taps, each of the L taps of the tapped delay line FIR filter representing a path of the multi-path channel, each of the L taps having a tap coefficient associated with it, the channel being modeled by estimating the coefficients of each of the L taps, each of the L tap coefficients being estimated by solving a set of L simultaneous linear equations, the set of L simultaneous linear equations being obtained by using a received signal, the signal received at a receiver being a transmitted spread pre-defined training sequence on the multi-path channel, a spread pre-defined training sequence is obtained by spreading each symbol of a pre-defined training sequence by a pre-defined spreading sequence, the pre-defined training sequence being any known sequence of symbols, the samples of the received signal being used to estimate a symbol boundary, the symbol boundary being a time of arrival of a symbol in a strongest path of the multi-path channel, the estimated symbol boundary being used to estimate a time of arrival of an earliest path of the multi-path channel, regardless of the energy in the earliest path, the method comprising the steps of:

a. buffering 3N samples of the received signal, the buffered samples covering three consecutive symbols of the received signal, a symbol lying in middle of the three consecutive symbols being buffered at a $0^{th}$ time lag, the $0^{th}$ time lag corresponding to the estimated symbol boundary;

b. computing 2L−1 cross correlations between the buffered 3N samples and the pre-defined spreading sequence, for a pre-defined set of 2L−1 time lags, the pre-defined set of 2L−1 time lags covering L−1 positive time lags and L−1 negative time lags with respect to the $0^{th}$ time lag, the 2L−1 correlations are estimated symmetrically around the $0^{th}$ time lag to capture pre-cursor and post-cursor parts of the multi-path channel impulse response;

c. selecting L possible sets of L cross correlations for L consecutive time lags, from the computed 2L−1 cross correlations;

d. computing the energy in each of the L possible sets, the energy being computed by adding the squares of the magnitudes of each of the L cross correlations in each of the L possible sets;

e. selecting a set of L cross correlations having the maximum energy among all the L possible sets of L cross correlations, the selected set of L cross correlations covering maximum pre-cursor and post-cursor energy, a time instant corresponding to the time lag of the first element in the selected set of L cross correlations corresponding to the time of arrival of the earliest path of the multi-path channel, regardless of the energy in the earliest path; and f. estimating each of the L tap coefficients by using the selected set of L cross correlations, wherein the step of estimating each of the L tap coefficients includes the steps of:

i. forming a set of L simultaneous linear equations by using the selected set of L cross correlations, the three consecutive symbols of the received signal, and autocorrelations of the pre-defined spreading sequence, wherein the non-diagonal elements of the autocorrelation matrix need not be zero, thus the pre-defined spreading sequence need not be orthogonal with each other at different time lags; and ii. determining each of the L tap coefficients by solving the set of L simultaneous linear equations, the each of the L tap coefficients being represented in a matrix form h, wherein $h = R_{bb}^{-1} R_{by}$, and h denotes a vector $[h_0 \; h_1 \; h_2 \; \ldots \; h_{(L-1)}]^T$, with $h_i$ denoting $i^{th}$ tap coefficient $R_{by}$ denoting the vector $[p_0 \; p_1 \; p_2 \; \ldots \; p_{(L-1)}]^T$, with $p_i$ denoting $i^{th}$ cross correlation in the selected set of L cross correlations, and $R_{bb}$ denoting an autocorrelation matrix.

2. The method as recited in claim 1, wherein the autocorrelation matrix $R_{bb}$ is defined by a mathematical term, the mathematical term being represented by:

$$R_{bb} = d(0) \begin{bmatrix} r_{bb}(0) & r_{bb}(1) & \ldots & r_{bb}(L-1) \\ r_{bb}(1) & r_{bb}(0) & \ldots & r_{bb}(L-2) \\ \ldots & \ldots & \ldots & \ldots \\ r_{bb}(L-1) & r_{bb}(L-2) & \ldots & r_{bb}(0) \end{bmatrix} +$$

$$d(-1) \begin{bmatrix} 0 & r_{bb}(N-1) & \ldots & r_{bb}(N-L+1) \\ 0 & 0 & \ldots & r_{bb}(N-L+2) \\ \ldots & \ldots & \ldots & \ldots \\ 0 & 0 & \ldots & 0 \end{bmatrix} +$$

$$d(1) \begin{bmatrix} 0 & 0 & \ldots & 0 \\ r_{bb}(N-1) & 0 & \ldots & 0 \\ \ldots & \ldots & \ldots & \ldots \\ r_{bb}(N-L+1) & r_{bb}(N-L+2) & \ldots & r_{bb}(N) \end{bmatrix}$$

wherein $r_{bb}(i)$ denotes the autocorrelation of the pre-defined spreading sequence for the $i^{th}$ time lag, d(0) refers to the middle symbol of the three consecutive symbols, d(1) refers to the symbol succeeding to the middle symbol and d(−1) refers to the symbol preceding the middle symbol.

3. A system for characterization of a multi-path channel in a Direct Sequence Spread Spectrum (DSSS) based wireless communication system, the multi-path channel being modeled as a tapped delay line Finite Impulse Response (FIR) filter, the tapped delay line FIR filter having L taps, each of the L taps of the tapped delay line FIR filter representing a path of the multi-path channel, each of the L taps having a tap coefficient associated with it, the channel being modeled by estimating the coefficients of each of the L taps, each of the L tap coefficients being estimated by solving a set of L simultaneous linear equations, the set of L simultaneous linear equations being obtained by using a received signal, the signal received at a receiver is a transmitted spread pre-defined training sequence on the multi-path channel, a spread pre-defined training sequence is obtained by spreading each symbol of a pre-defined training sequence by a pre-defined spreading sequence, the pre-defined training sequence being any known sequence of symbols, the samples of the received signal being used to estimate a symbol boundary, the symbol boundary being a time of arrival of a symbol in a strongest path of the multi-path channel, the estimated symbol boundary being used to estimate a time of arrival of an earliest path of the multi-path channel, regardless of the energy in the earliest path, the system comprising:

a buffer buffering 3N samples of the received signal, the buffered samples covering three consecutive symbols of the received signal, a symbol lying in middle of the three consecutive symbols being buffered at a $0^{th}$ time lag, the $0^{th}$ time lag corresponding to the estimated symbol boundary;

b. a correlator computing 2L−1 cross correlations between the buffered 3N samples and the pre-defined spreading sequence, for a pre-defined set of 2L−1 time lags, the pre-defined set of 2L−1 time lags covering L−1 positive time lags and L−1 negative time lags with respect to the $0^{th}$ time lag, the 2L−1 correlations are estimated symmetrically around the $0^{th}$ time lag to capture pre-cursor and post-cursor parts of the multi-path channel impulse response;

c. a set selector selecting L possible sets of L cross correlations for L consecutive time lags, from the computed 2L−1 cross correlations;

d. an energy calculator computing the energy in each of the L possible sets, the energy being computed by adding the squares of the magnitudes of each of the L cross correlations in each of the L possible sets;

e. a peak selector selecting a set of L cross correlations having the maximum energy among all the L possible sets of L cross correlations, the selected set of L cross correlations covering maximum pre-cursor and post-cursor energy, a time instant corresponding to the time lag of the first element in the selected set of L cross correlations corresponding to the time of arrival of the earliest path of the multi-path channel, regardless of the energy in the earliest path; and f. a tap coefficient estimator estimating each of the L tap coefficients by using the selected set of L cross correlations, forming a set of L simultaneous linear equations by using the selected set of L cross correlations, the three consecutive symbols of the received signal, and autocorrelations of the pre-defined spreading sequence, wherein the non-diagonal elements of the autocorrelation matrix need not be zero, thereby, the pre-defined spreading sequence need not be orthogonal with each other at different time lags, determining each of the L tap coefficients by solving the set of L simultaneous linear equations, the each of the L tap coefficients being represented in a matrix form h, wherein $h=R_{bb}^{-1}R_{by}$, and h denotes a vector $[h_0\ h_1\ h_2\ \ldots\ h_{(L-1)}]^T$, with $h_i$ denoting $i^{th}$ tap coefficient, $R_{by}$ denoting the vector $[p_0\ p_1\ p_2\ \ldots\ p_{(L-1)}]^T$, with $p_i$ denoting $i^{th}$ cross correlation in the selected set of L cross correlations, and $R_{bb}$ denoting an autocorrelation matrix.

4. A computer program product disposed on a computer readable storage medium storing instructions that, when executed by a computer, cause the computer to perform characterization of a multi-path channel in a Direct Sequence Spread Spectrum (DSSS) based wireless communication system, the multi-path channel being modeled as a tapped delay line Finite Impulse Response (FIR) filter, the tapped delay line FIR filter having L taps, each of the L taps of the tapped delay line FIR filter representing a path of the multi-path channel, each of the L taps having a tap coefficient associated with it, the channel being modeled by estimating the coefficients of each of the L taps, each of the L tap coefficients being estimated by solving a set of L simultaneous linear equations, the set of L simultaneous linear equations being obtained by using a received signal, the signal received at a receiver is a transmitted spread pre-defined training sequence on the multi-path channel, a spread pre-defined training sequence is obtained by spreading each symbol of a pre-defined training sequence by a pre-defined spreading sequence, the pre-defined training sequence being any known sequence of symbols, the samples of the received signal being used to estimate a symbol boundary, the symbol boundary being a time of arrival of a symbol in a strongest path of the multi-path channel, the estimated symbol boundary being used to estimate a time of arrival of an earliest path regardless of the energy in the earliest path of the multi-path channel, the computer program product comprising instructions to perform the steps of:

a. buffering 3N samples of the received signal, the buffered samples covering three consecutive symbols of the received signal, a symbol lying in middle of the three consecutive symbols being buffered at a $0^{th}$ time lag, the $0^{th}$ time lag corresponding to the estimated symbol boundary;

b. computing 2L−1 cross correlations between the buffered 3N samples and the pre-defined spreading sequence, for a pre-defined set of 2L−1 time lags, the pre-defined set of 2L−1 time lags covering L−1 positive time lags and L−1 negative time lags with respect to the $0^{th}$ time lag, the 2L−1 correlations are estimated symmetrically around the $0^{th}$ time lag to capture pre-cursor and post-cursor parts of the multi-path channel impulse response;

c. selecting L possible sets of L cross correlations for L consecutive time lags, from the computed 2L−1 cross correlations;

d. computing the energy in each of the L possible sets, the energy being computed by adding the squares of the magnitudes of each of the L cross correlations in each of the L possible sets;

e. selecting a set of L cross correlations having the maximum energy among all the L possible sets of L cross correlations, the selected set of L cross correlations covering maximum pre-cursor and post-cursor energy, a time instant corresponding to the time lag of the first element in the selected set of L cross correlations corresponding to the time of arrival of the earliest path of the multi-path channel, regardless of the energy in the earliest path; and f. estimating each of the L tap coefficients by using the selected set of L cross correlations, wherein the step of estimating each of the L tap coefficients includes the steps of:

i. forming a set of L simultaneous linear equations by using the selected set of L cross correlations, the three consecutive symbols of the received signal, and autocorrelations of the pre-defined spreading sequence, wherein the non-diagonal elements of the autocorrelation matrix need not be zero, thereby, the pre-defined spreading sequence need not be orthogonal with each other at different time lags; and ii. determining each of the L tap coefficients by solving the set of L simultaneous linear equations, the each of the L tap coefficients being represented in a matrix form h, wherein $h=R_{bb}^{-1}R_{by}$, and h denotes a vector $[h_0\ h_1\ h_2\ \ldots\ h_{(L-1)}]^T$, with $h_i$ denoting the $i^{th}$ tap coefficient $R_{by}$ denoting the vector $[p_0\ p_1\ p_2\ \ldots\ p_{(L-1)}]^T$, with $p_i$ denoting $i^{th}$ cross correlation in the selected set of L cross correlations, and $R_{bb}$ denoting an autocorrelation matrix.

* * * * *